Patented Nov. 11, 1947

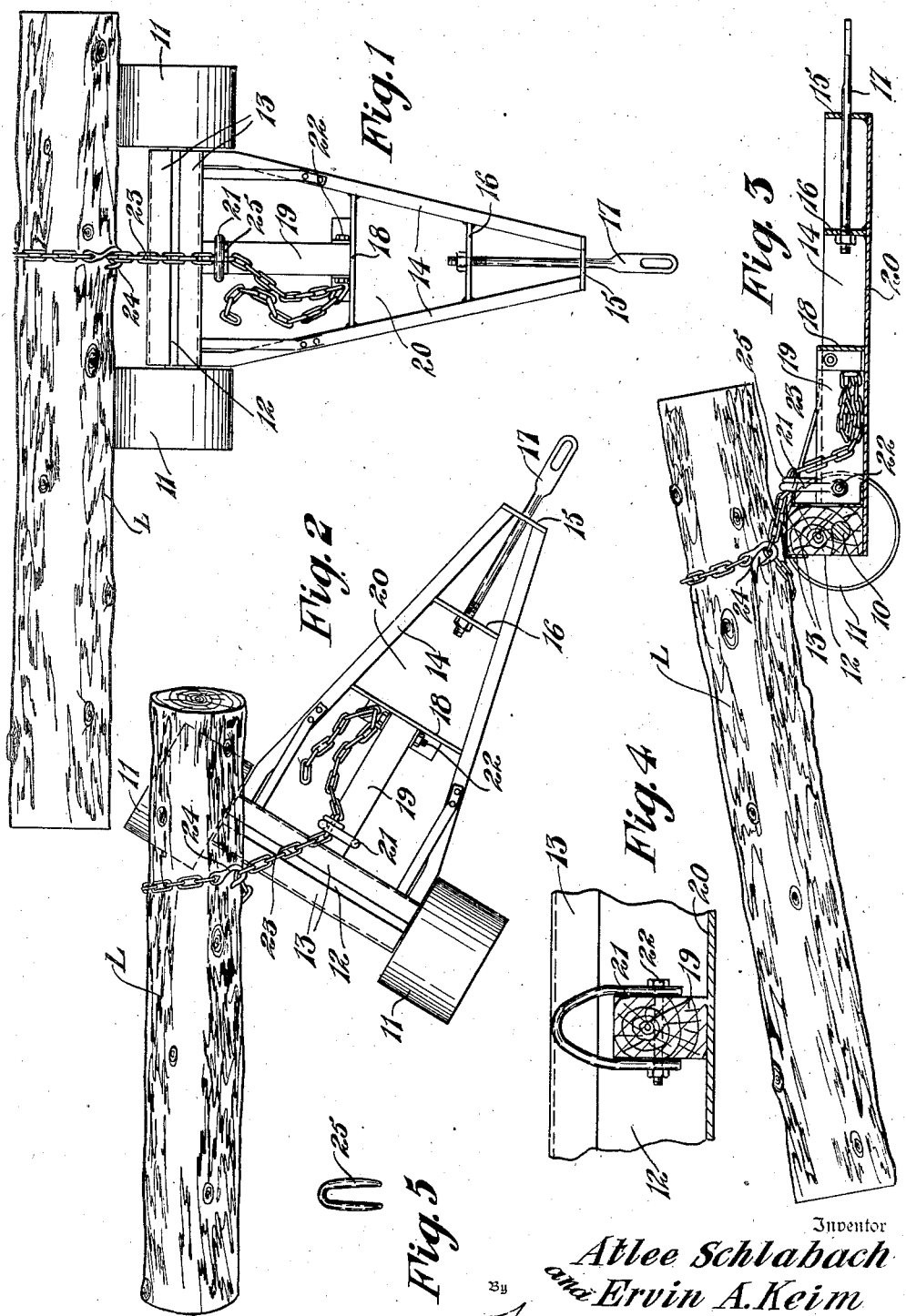

2,430,786

UNITED STATES PATENT OFFICE 2,430,786

LOG CART

Atlee Schlabach and Ervin A. Keim, Charm, Ohio

Application July 21, 1945, Serial No. 606,330

1 Claim. (Cl. 214—65.3)

The invention relates to a logging cart or truck, and particularly to a cart for loading and dragging logs through the woods.

Logging carts such as are at present in general use comprise generally a bolster supported upon a pair of wheels and having beams or hounds connected thereto for attaching to a team, tractor or other power means, grab hooks or tongs being connected to the cart as by chains and adapted to grip the log near one end.

In using such logging carts to load a log, the cart is backed against one side of a log lying upon the ground, near one end of the log and the beams or hounds are raised to vertical position and the grab hooks or tongs are attached to opposite sides of the log.

The team or tractor is then driven off, pulling the hounds back to a substantially horizontal position and raising the adjacent end of the log onto the bolster of the logging cart.

The object of the present invention is to provide a logging cart so constructed and arranged that it is only necessary to back the cart against one side of a log, connect a chain around the adjacent end of the log and drive away, drawing the adjacent end of the log over one wheel and onto the bolster of the cart.

Another object is to provide such a logging cart with a single chain for passing around the log and pulling the adjacent end of the log onto the bolster without the necessity of raising the hounds to vertical position and then lowering them to horizontal position in order to raise the log onto the cart.

A further object is to provide a novel means for taking up slack in the chain and securing it to the cart, said means comprising a clevis through which the free end of the chain is drawn and a U-shape clip for engaging over the chain in front of the clevis.

The above objects, together with others which will be apparent from the drawing and following description, or which may be later referred to, may be attained by constructing and operating the improved log cart in the manner hereinafter described, and illustrated in the accompanying drawing, in which;

Figure 1 is a top plan view of the logging cart to which the invention pertains, showing the cart backed against the side of a log attached to the adjacent end thereof by the improved chain connection, and ready to be driven away to drag the log away;

Fig. 2 a similar view showing the manner in which the end of the log swings up over one wheel of the cart as the cart is driven away;

Fig. 3 a longitudinal section through the cart showing the manner in which the attached end of the log is pulled onto the bolster as the cart continues to move away;

Fig. 4 an enlarged fragmentary transverse sectional view through the cart, showing the clevis through which the free end of the chain is drawn, and;

Fig. 5 an elevation of the U-shape clip which cooperates with the clevis for attaching the free end of the chain to the cart.

The cart is provided with the heavy axle 10 upon which are journalled the broad, low wheels 11. The axle is rigidly connected to the bolster 12 which is preferably of such a height that its top is substantially on a level with the top of the wheels 11.

In order to protect the bolster, the top corners thereof may be reinforced with angle irons 13, upon which the end of the log may be supported as will be later described.

Extending forward from the bolster, and rigidly attached thereto, are the hounds or beams 14, connected together at their converging, forward ends as by the plate 15, and at a point spaced from their ends by the heavy plate or bar 16, to which a clevis 17 of any desired construction is attached for connection to a tractor or team.

A transverse plate 18 may be connected at opposite ends of the hounds at a point between the bolster and the plate 16, and a longitudinal beam 19 is connected at opposite ends to the bolster and to the transverse plate 18.

For the purpose of forming a pan for carrying the chain, or other articles, a plate 20 may be connected to the under sides of the bolster and hounds, and the transverse plates 15, 16 and 18 may be welded or otherwise attached at their lower ends to said plate 20, in order to strengthen and reinforce the cart and produce a strong, rigid structure.

An inverted, substantially U-shape clevis 21 may be attached to the longitudinal beam 19, at a point near the bolster, as by the bolt 22, for the purpose of connecting the chain 23, as will be hereinafter described.

This chain has a hook 24 at one end, and the other end of the chain may be located through the clevis 21 and is normally carried upon the horizontal, bottom plate 20, as shown in the drawings.

In the operation of the device, the cart is backed, by a tractor or team, against the side of a log L, near one end thereof, as shown in Fig. 1, and the cart remains in horizontal position and is not disconnected from the tractor or team as in present practice.

The end of the chain 23 with the hook 24 thereon is then passed entirely around the log and the hook is hooked over the looped portion of the chain as shown in the drawings, after which the free end of the chain is drawn tightly through the clevis 21 to take up any slack in the chain, and the U-shape clip 25 is engaged over the chain upon the forward side of the clevis 21, holding the chain securely in this position.

It is then only necessary to drive the cart straight away at right angles, to the log which will cause the adjacent end of the log to be lifted up over one wheel of the cart, as shown in Fig. 2, and as the cart continues to move this end of the log will ride off of the wheel and onto the bolster as shown in Fig. 3, and the log in this position may be carried off to any desired destination.

Frm the above it will be evident that the improved log cart is a considerable improvement over present practice since it is not necessary to unhitch the cart from the tractor or team and tilt it to a vertical position in order to pick up a log, nor is it necessary to drive grab hooks or tongs into the sides of the log, but as above stated it is only necessary to back the cart against the log, loop the chain around the log and tighten the chain through the clevis 12 by means of the clip 25, and then drive the cart away pulling the log up onto the cart as it is driven away.

We claim:

A log cart comprising an axle, a spaced pair of wheels upon the axle, a bolster on the axle having its top approximately in the plane of the tops of the wheels, hounds extending forwardly from the bolster, a single chain adjustably carried by the cart adjacent to the bolster said chain being of a length to extend some distance beyond the wheels, and a hook upon the outer end of the chain whereby the cart may be backed against the side of a log near one end thereof and the chain may be wrapped in a closed loop around the log and the cart driven away at right angles to the log pulling the adjacent end of the log over one wheel and onto the bolster all while the hounds remain in substantially horizontal position, a clevis upon the cart through which the chain is slidably located and a U-shape clip for securing the chain to the clevis.

ATLEE SCHLABACH.
ERVIN A. KEIM.

REFERENCES CITED

The following references are of record in the file of this patent:

UNITED STATES PATENTS

| Number | Name | Date |
| --- | --- | --- |
| Re. 11,987 | Lindsey | May 13, 1902 |
| 643,933 | Bender | Feb. 20, 1900 |
| 671,659 | Rooney | Apr. 9, 1901 |
| 772,234 | Hancock | Oct. 11, 1904 |
| 1,207,701 | Barry | Dec. 12, 1916 |